Reissued Sept. 21, 1926.

Re. 16,423

UNITED STATES PATENT OFFICE.

RAYMOND F. BACON, OF PELHAM, AND CLEO H. KIDWELL, OF DONGAN HILLS, NEW YORK, ASSIGNORS TO JOHN MANNING VAN HEUSEN, OF BOSTON, MASSACHUSETTS.

PROCESS OF MAKING MOLDABLE FABRIC FOR VARIOUS USES.

No Drawing. Original No. 1,509,920, dated September 30, 1924, Serial No. 598,694, filed November 2, 1922. Application for reissue filed July 16, 1926. Serial No. 123,007.

The present invention relates to a method of making moldable fabric for various uses as hereinafter more fully set forth. More particularly the invention relates to a method of chemically treating woven or knitted fabrics so as to render the same moldable or plastic and to means for molding and setting the fabric in any desired shape or form.

Our invention may be applied, and will be found highly useful, in the manufacture of a large number of different articles. It may be used in the process of manufacture of many articles which heretofore have been made in whole or in part of fabric which it was necessary to cut into pieces of the desired shape and subsequently stitch together.

Broadly stated, our invention comprises, first, subjecting the woven or knitted fabric, or the portion thereof which it is desired to mold or shape, to the action of an acid; second, washing out the acid with water or an alkaline solution, or both, and third, molding the fabric on a form of the desired shape and drying it while on the form. We have found that by utilizing acid of the proper strength and by subjecting the fabric to its action for the proper length of time, the fabric so treated will become, to a degree, plastic and moldable. That is to say, the fabric while in this condition may be placed over a form of the desired shape, and by applying pressure and heat, be caused to take on the shape of the said form.

The strength of the acid used and the length of time of the acid treatment will vary with the particular material treated. So also the particular method of subjecting the material to the acid may vary widely. Accordingly, we shall not endeavor herein to describe all of the ways in which our invention may be practiced. But in order that those skilled in the art may understand the invention fully and may apply it to any desired material, we will for purposes of illustration merely, and not with the intention of limiting the scope of the invention, describe one way in which we have applied the invention to one type of fabric with excellent results.

The fabric whose treatment we are about to describe is a closely knitted fabric made of cotton yarn, and comprising one or more thicknesses or plies of material. A fabric of this sort has a considerable degree of body and thickness, and when stretched does not present an openwork or porous appearance of so marked a degree as appears in a stretched knitted fabric which is made of relatively fine yarn and which is loosely knitted. For this particular fabric we have found that sulphuric acid of the strength of 70 to 80%, and preferably 73 to 75%, by weight, acting upon the fabric for approximately one minute at ordinary room temperature, gives the desired results. It is, of course, necessary that the acid act upon all of the threads of the fabric at all points, both interior and exterior. In order to bring about this result with tightly woven or knitted fabrics it may be found necessary to utilize means of forcing the acid through the fabric so as thoroughly to saturate the same. After this treatment has been carried on for approximately one minute as aforesaid, the fabric is thoroughly washed with water so that all traces of an acid reaction are removed. It may be further necessary to treat the fabric with an alkaline solution in order to insure the complete removal of the acid.

When the sulphuric acid is applied to the cotton fabric as above described, it appears that the acid combines with all of the moisture (both in physical form and chemical combination with the cellulose) which is present in the fabric. When the fabric is subsequently washed with water the sulphuric acid is completely removed and we believe that the cellulose combines with the water to form hydrocellulose. We have discovered that when the fabric is in this condition it is easily distorted to almost any desired shape, and it is this property of the fabric which we utilize in the present invention.

As above stated, we place the fabric after treating the same, on a form of the desired shape. In certain instances where the new shape which the fabric is to have is not materially different from the shape of the fabric before it was treated, it will not be necessary to exert pressure or heat on the fabric, since the powerful shrinking properties of the acid will cause the fabric to take on the exact shape of the form while the fabric is drying at ordinary room temperature. However, if the new shape which the fabric is to assume is substantially different from the original shape of the fabric, it will be found advantageous to apply pressure and heat to the fabric while on the form or mold. The degree of heat necessary, and also the amount of pressure required, will vary widely, depending upon the type of fabric which is being used and also upon the contour of the form upon which the fabric is placed. In some instances it may be sufficient simply to pass an iron over the fabric after placing the same on the form. In other instances the form itself may be heated by, for example, the provision of electrical heating units within the form, or by placing the form itself with the fabric thereon in an oven. If desired, the form may be constructed of two separate and corresponding sections, comprising male and female elements between which the fabric is placed. Pressure may then be applied to these elements and the fabric pressed into the exact shape of the form. It is true that the extent to which the fabric in its plastic condition can be stretched and shaped is not unlimited, since the threads of the fabric itself while they are susceptible of a greater distortion and stretching while in this condition than normally, will nevertheless, be separated and broken if too great a tension is applied. Consequently, if the form which is used is of a nature which will require extreme distortion and stretching of the threads of the fabric, we have found it advisable to provide fabric for this treatment, which itself generally conforms to the shape of the form upon which it is to be placed. That is, the fabric may be knitted or woven in such a manner as to give it the general contour of the ultimate shape which it is to have, or, if desired, the fabric to be treated may be made up of two or more pieces of fabric which have been cut to the desired shape and stitched together. For example, in the manufacture of hats by the above described process, we have found it advisable to knit or weave a fabric, the edges of which will lie flat on a plane surface when the fabric is placed thereon and the central portion of which is raised or bulged slightly to conform in a general way to the outline of the crown of the hat. When the acid treatment and subsequent shaping of the fabric on the form has been completed, the threads have not been placed under a tension which would in any way weaken the fabric, but nevertheless, the fabric has assumed the exact shape of a hat. As another example, in the manufacture of boots or shoes, we have found it advantageous to provide a heavy fabric sock, which in general conforms to the shape of the foot, and to subject this sock to the acid treatment, and subsequently to the shaping process by placing the sock on a shoe tree and pressing and heating the same so that it will take on the exact contour of the said shoe tree.

When the fabric has been treated with sulphuric acid in accordance with the above described method, and has, subsequently, been dried on a form of the desired shape, the fabric takes on a considerable degree of stiffness. As a result of this stiffening property of the treatment, the fabric when taken from the form does not lose its shape. On the contrary, the stiffness which is imparted to it is sufficient with most fabrics to render the same self-supporting. That is to say, when the fabric has been taken off the form it retains its shape even after a considerable amount of handling or rough usage. It will be seen that fabric treated in accordance with our invention may be used as a base to which other materials may be attached. For instance, in the manufacture of ladies' hats, the treated fabric may be used as the frame or shape of the hat, and to it may be attached ribbons, feathers, or other ornaments which are commonly used in the trimming of hats.

If the article which is manufactured in accordance with the process above described is likely in the subsequent use thereof, to become moistened or wet with water, it may be found desirable to treat the fabric with waterproofing materials. Any waterproofing materials may be used for this purpose, but we have found that excellent results are obtained by subjecting the fabric first to the action of aluminum acetate and then to the action of a strong soap solution, for example, sodium stearate. This treatment may be applied to the fabric either before or after the said fabric has been molded and shaped on the form. We preferably subject the fabric to the treatment after the fabric has been treated with the acid and before the said fabric has been placed on the form. It will be noted that when the fabric has been waterproofed, moisture will not penetrate the fabric or be absorbed thereby to any appreciable degree, and consequently, the fabric will not lose its stiffness and shape, which would tend to occur if a considerable amount of moisture were permitted to enter the fabric.

The terms and expressions which we have employed are used as terms of description and not of limitation, and we have no intention, in the use of such terms and expressions, of excluding any equivalents of the features described, or portions thereof, but recognize that various modifications are possible within the scope of the invention claimed.

What we claim is:

1. The method of molding or shaping fabric, which consists in subjecting the fabric to the action of an acid and then washing the acid out, thereby placing the fabric in a semi-plastic or moldable condition, molding or shaping the fabric, while wet, into substantially the desired contours, and then drying the said fabric.

2. The method of molding or shaping knitted fabric, which consists in subjecting the fabric to the action of an acid and then washing the acid out, thereby placing the fabric in a semi-plastic or moldable condition, molding or shaping the fabric, while wet, into substantially the desired contours, and then drying the said fabric.

3. The method of molding or shaping fabric, which consists in subjecting the fabric to the action of sulphuric acid, molding or shaping the fabric, while wet, into substantially the desired contours, and drying the said fabric.

4. The method of molding or shaping knitted fabric, which consists in subjecting the fabric to the action of sulphuric acid, molding or shaping the fabric, while wet, into substantially the desired contours, and drying the said fabric.

5. The method of molding or shaping fabric, which consists in subjecting the fabric, for approximately one minute, to the action of sulphuric acid of a strength from 70 to 80% by weight, washing out the acid, molding or shaping the fabric, while wet, into substantially the desired contours, and drying it on a form.

6. The method of molding or shaping knitted fabric, which consists in subjecting the fabric, for approximately one minute, to the action of sulphuric acid of a strength from 70 to 80% by weight, washing out the acid, molding or shaping the fabric, while wet, into substantially the desired contours, and drying it on a form.

7. The method of molding or shaping fabric, which consists in subjecting the fabric to the action of an acid, washing out the acid, placing the fabric, while wet, on a form of the desired shape, applying pressure and heat to shape the fabric substantially into the contours of the form, and leaving the fabric on the said form until dry.

8. The method of molding or shaping knitted fabric, which consists in subjecting the fabric to the action of an acid, washing out the acid, placing the fabric, while wet, on a form of the desired shape, applying pressure and heat to shape the fabric substantially into the contours of the form, and leaving the fabric on the said form until dry.

9. The method of molding or shaping fabric, which consists in subjecting the fabric to the action of an acid, washing out the acid, treating the fabric with a solution of aluminum acetate, then treating the fabric with a strong soap solution, and finally molding or shaping the fabric, while wet, into the desired contours and then drying it.

10. The method of molding or shaping knitted fabric, which consists in subjecting the fabric to the action of an acid, washing out the acid, treating the fabric with a solution of aluminum acetate, then treating the fabric with a strong soap solution, and finally molding or shaping the fabric, while wet, into the desired contours and then drying it.

11. The method of molding or shaping fabric, which consists in subjecting the fabric to the action of an acid, washing out the acid, molding or shaping the fabric into substantially the desired contours, and drying it on a form, treating the fabric with a solution of aluminum acetate, and finally treating it with a strong soap solution.

12. The method of molding or shaping knitted fabric, which consists in subjecting the fabric to the action of an acid, washing out the acid, molding or shaping the fabric into substantially the desired contours, and drying it on a form, treating the fabric with a solution of aluminum acetate, and finally treating it with a strong soap solution.

13. The method of molding or shaping fabric, which consists in subjecting the fabric to the action of an acid, washing out the acid, treating the fabric with water-proofing materials, and finally placing the fabric, while wet, on a form of the desired shape, molding or shaping the fabric substantially into the contours of said form, and drying it thereon.

14. The method of molding or shaping knitted fabric, which consists in subjecting the fabric to the action of an acid, washing out the acid, treating the fabric with water-proofing materials, and finally placing the fabric, while wet, on a form of the desired shape, molding or shaping the fabric substantially into the contours of said form, and drying it thereon.

RAYMOND F. BACON.
CLEO H. KIDWELL.